(12) United States Patent
Watford

(10) Patent No.: US 9,054,516 B2
(45) Date of Patent: Jun. 9, 2015

(54) CIRCUIT BREAKER TRIP NOTIFICATION SYSTEMS AND METHODS

(75) Inventor: Russell Thomas Watford, Lawrenceville, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 13/540,141

(22) Filed: Jul. 2, 2012

(65) Prior Publication Data

US 2013/0021163 A1  Jan. 24, 2013

Related U.S. Application Data

(60) Provisional application No. 61/509,786, filed on Jul. 20, 2011.

(51) Int. Cl.
*G08B 21/00* (2006.01)
*H02H 3/04* (2006.01)

(52) U.S. Cl.
CPC *H02H 3/04* (2013.01); *H02H 3/046* (2013.01)

(58) Field of Classification Search
CPC . H01H 71/04; H01H 73/14; H01H 2071/467; H01H 83/20; H01H 71/128; H01H 71/0271; H02H 3/04; H02H 3/00; G08B 21/185; G08B 5/36; G08B 21/187
USPC ............ 340/635, 638, 686.1; 335/17; 337/20, 337/241, 265
See application file for complete search history.

(56) References Cited

U.S. PATENT DOCUMENTS

| | | | |
|---|---|---|---|
| 3,751,678 A * | 8/1973 | Kawasaki et al. | 361/5 |
| 4,706,073 A | 11/1987 | Vila Masot | |
| 6,961,005 B2 * | 11/2005 | Clement et al. | 340/870.07 |
| 7,995,314 B2 * | 8/2011 | Titus | 361/42 |
| 2010/0256934 A1 * | 10/2010 | Rohrbaugh | 702/62 |
| 2011/0175699 A1 * | 7/2011 | Huss et al. | 337/143 |
| 2011/0298625 A1 * | 12/2011 | Sisley et al. | 340/652 |
| 2012/0185185 A1 * | 7/2012 | Bae et al. | 702/58 |

FOREIGN PATENT DOCUMENTS

EP  1975967 A1  10/2008

OTHER PUBLICATIONS

European Search Report mailed Aug. 20, 2014 corresponding to European Application No. 12176767.7 filed Jul. 17, 2012 (6 pages).

* cited by examiner

*Primary Examiner* — George Bugg
*Assistant Examiner* — Edny Labbees

(57) ABSTRACT

The present invention provides circuit breaker notification to users. The invention includes systems, apparatus, and methods to monitor a position of an operating handle of a circuit breaker; sense a change in the position of the circuit breaker operating handle to a tripped position; generate a first signal representative of an identifier of the circuit breaker with the operating handle in the tripped position; transmit the first signal to a communications device; and provide notification of a trip event within the identified circuit breaker to a user via the communications device. Numerous additional aspects are disclosed.

17 Claims, 5 Drawing Sheets

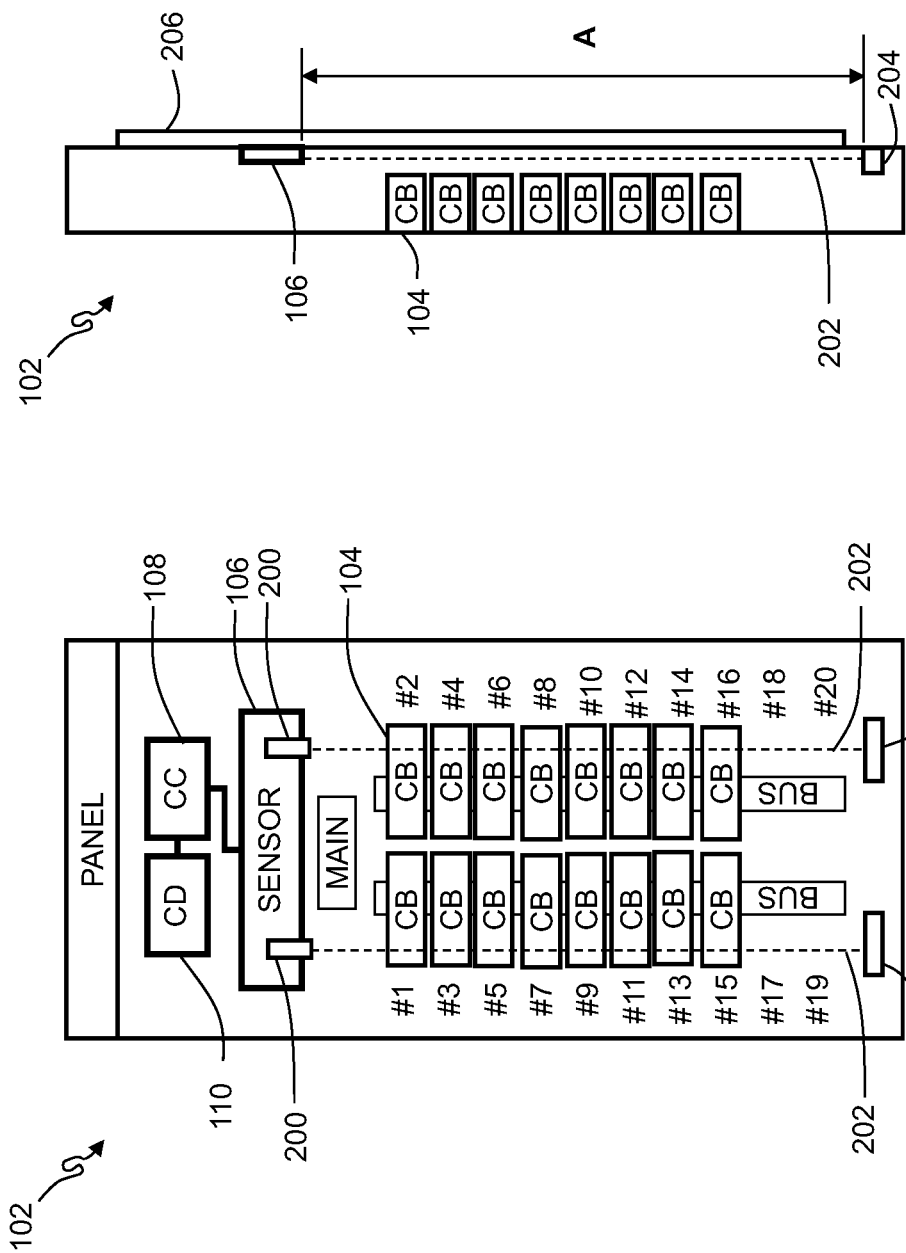

CIRCUIT BREAKER TRIP NOTIFICATION SYSTEMS AND METHODS

RELATED APPLICATIONS

This application claims priority to U.S. Provisional Patent Application Ser. No. 61/509,786 filed on Jul. 20, 2011, entitled "RESIDENTIAL BREAKER STATUS INDICATOR" the disclosure of which is hereby incorporated by reference in its entirety herein.

FIELD

The present invention relates generally to apparatus, systems and methods adapted to provide notification when a circuit breaker trips.

BACKGROUND

Circuit breaker panels are used to protect electrical circuitry from damage due to an overcurrent condition, such as an overload, a relatively high-level short circuit, or a ground fault condition. To perform that function, circuit breaker panels include circuit breakers that typically contain a switch unit and a trip unit. The switch unit is coupled to the electrical circuitry (i.e., lines and loads) such that it can open or close the electrical path of the electrical circuitry. The switch unit includes a pair of separable contacts per phase, a pivoting contact arm per phase, an operating mechanism, and an operating handle.

In the overcurrent condition, all the pairs of separable contacts are disengaged or tripped, opening the electrical circuitry and moving the operating handle to a tripped position. When the overcurrent condition is no longer present, the circuit breaker can be reset using the operating handle such that all the pairs of separable contacts are engaged, closing the electrical circuitry.

In addition to manual overcurrent protection via the operating handle, automatic overcurrent protection is also provided via the trip unit. The trip unit, coupled to the switch unit, senses the electrical circuitry for the overcurrent condition and automatically trips the circuit breaker. When the overcurrent condition is sensed, a tripping mechanism included in the trip unit actuates the operating mechanism, thereby disengaging the first contact from the second contact for each phase. Typically, the operating handle is coupled to the operating mechanism such that when the tripping mechanism actuates the operating mechanism to separate the contacts, the operating handle also moves to the tripped position.

Switchgear and switchboard are general terms used to refer to electrical equipment including metal enclosures that house switching and interrupting devices such as fuses, circuit breakers and relays, along with associated control, instrumentation and metering devices. The enclosures also typically include devices such as bus bars, inner connections and supporting structures (referred to generally herein as "panels") used for the distribution of electrical power. Such electrical equipment is typically maintained in a utility area of a building such as the basement of a residence or in a utility closet of a commercial establishment, or it can be maintained outside of such facilities and exposed to environmental weather conditions.

Typically, hinged doors or covers are provided on the front of the switchgear or switchboard sections to limit access to the devices contained therein. The doors and enclosures protect the equipment and serve as a safety precaution to protect people from the high-energy circuits within. However, the only indication that a circuit break has tripped may be that the operating handle (e.g., behind a closed door) has moved to the tripped position. Since the electrical equipment may not be in a prominent area, the residents or building occupants may not immediately notice that a circuit breaker has tripped. This can be problematic. For example, a food storage freezer may be on a branch circuit shared with an electrical outlet. If the circuit breaker for the branch circuit is tripped, the smell of rotting food several days later may be the first indication a resident notices that the food storage freezer has not had power. Therefore, there is a need for systems and methods to provide notification that a circuit breaker has tripped.

SUMMARY

In some embodiments, the present invention provides a method of notifying a user of a circuit breaker trip event. The method includes monitoring a position of an operating handle of a circuit breaker; sensing a change in the position of the circuit breaker operating handle to a tripped position; generating a first signal representative of an identifier of the circuit breaker with the operating handle in the tripped position; transmitting the first signal to a communications device; and providing notification of a trip event within the identified circuit breaker to a user via the communications device.

In some embodiments, the present invention provides a system operative to notify a user of a circuit breaker trip event. The system includes a panel including a plurality of circuit breakers disposed in one or more columns; at least one sensor disposed to monitor a position of an operating handle of at least one of the circuit breakers; a circuit adapted to receive input from the sensor and to generate a first signal representative of an identifier of a circuit breaker with an operating handle in a tripped position; and a communications device adapted to receive the first signal and provide notification of a trip event within the identified circuit breaker to a user.

In other embodiments, the present invention provides an apparatus adapted to be added to a circuit breaker panel and operative to notify a user of a circuit breaker trip event. The apparatus includes at least one sensor adapted to be disposed to monitor a position of an operating handle of at least one of circuit breaker within a panel; a circuit coupled to the sensor, adapted to receive input from the sensor, and adapted to generate a first signal representative of an identifier of a circuit breaker with an operating handle in a tripped position; and a communications device adapted to receive the first signal and provide notification of a trip event within the identified circuit breaker to a user.

Still other aspects, features, and advantages of the present invention will be readily apparent from the following detailed description by illustrating a number of exemplary embodiments and implementations, including the best mode contemplated for carrying out the present invention. The present invention can also be implemented using different and other embodiments, and its several details may be modified in various respects, all without departing from the scope of the present invention. Accordingly, the drawings and descriptions are to be regarded as illustrative in nature, and not as restrictive. The drawings are not necessarily drawn to scale. The invention covers all modifications, equivalents, and alternatives falling within the scope of the invention.

BRIEF DESCRIPTION OF THE DRAWINGS

FIG. 2 is a front plan view of an electrical distribution panel with a circuit breaker operating handle position sensor according to some embodiments of the present invention.

FIG. 3 is a side cross-section view of an electrical distribution panel with a circuit breaker operating handle position sensor according to some embodiments of the present invention.

DETAILED DESCRIPTION

Figure 1:
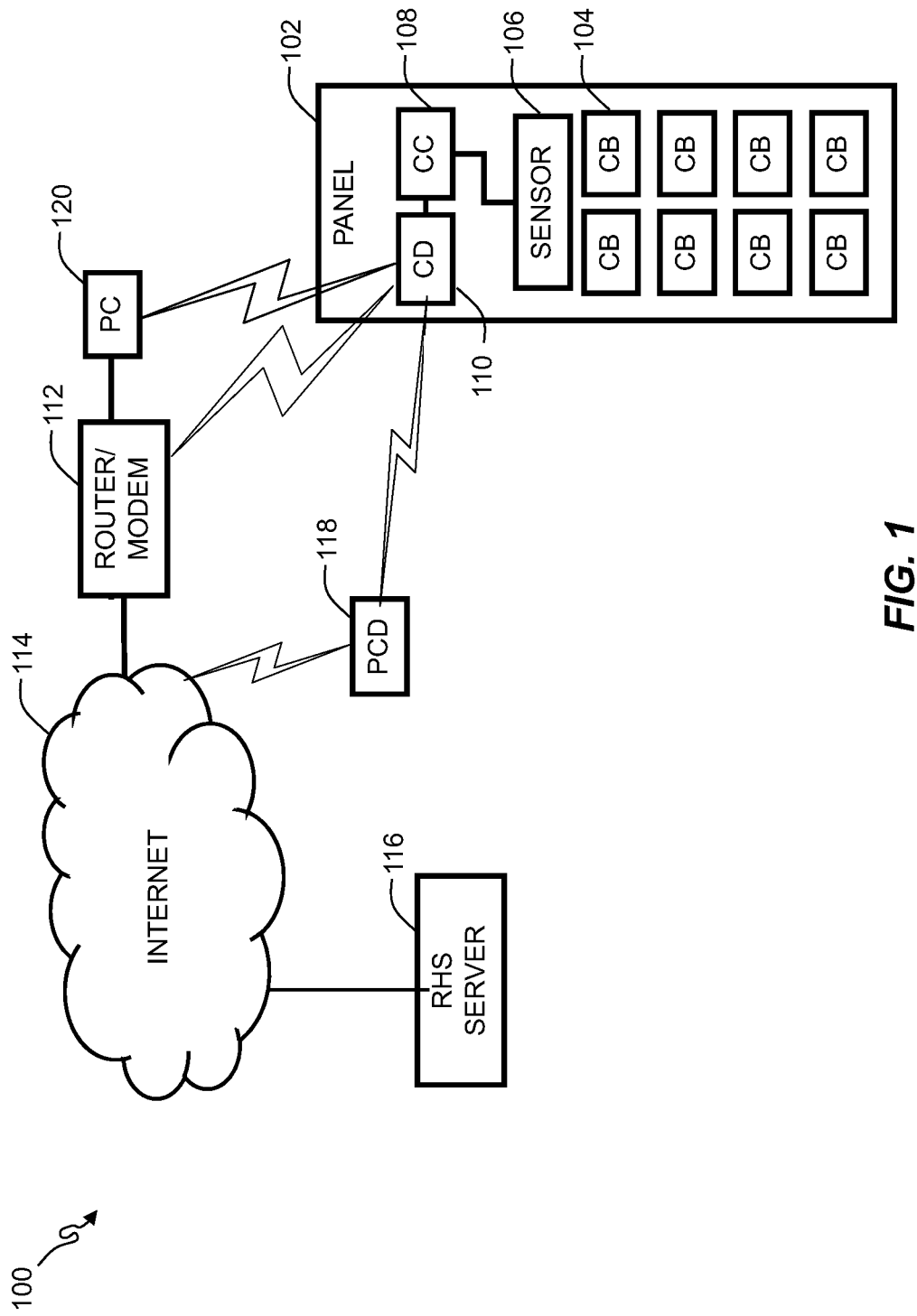
FIG. 1 is a block diagram depicting an example of circuit breaker trip notification system according to some embodiments of the present invention.

Reference will now be made in detail to the example embodiments which are illustrated in the accompanying drawings. Wherever possible, the same reference numbers will be used throughout the drawings to refer to the same or like parts. The drawings are not necessarily drawn to scale.

The aforementioned problem of residents of a home not being aware that a circuit breaker has tripped is overcome by embodiments of the present invention. In particular, the present invention provides a notification system operative to detect a circuit breaker trip or power loss event and to communicate the occurrence of the event (and/or the lack of power to a device) to a user of the system via telephone, cell phone, text message, email, Smartphone application, or any other practicable communications method. Any of Arc Fault Circuit Interrupters (AFCI), Combination Arc Fault Circuit Interrupters (CAFCI), Ground Fault Circuit Interrupters (GFCI), electronic circuit breakers, and standard thermal magnetic circuit breakers may be monitored and their status reported by the system of the present invention.

In some embodiments, the present invention is achieved through the use of one or more sensors operative to detect the position of the operating handle of a tripped circuit breaker. A suitable sensor may project a beam (e.g., optical, ultrasonic, laser, etc.) along a path that is normally clear but becomes blocked if any circuit breaker operating handle moves to the tripped position. In some embodiments, the sensor may include a beam transmitter, a reflector, and a receiver. The beam transmitter may project a beam at the reflector which reflects the beam to the receiver which may be collocated immediately adjacent the beam transmitter. The sensor may include circuitry adapted to determine the distance between the beam transmitter/receiver and the reflector. When a circuit breaker trips, the sensor may be disposed so that the operating handle of the circuit breaker intercepts the beam from the beam transmitter and reflects the beam back to the receiver. In some embodiments, the operating handles of the circuit breakers may be reflective or include reflectors mounted thereupon. From the perspective of the sensor circuitry, the distance between the beam transmitter/receiver and the reflector will appear to shorten when a breaker trips and the handle reflects the beam. In some embodiments, the sensor may be further adapted to detect this change and, based on the new distance detected, determine a position of a tripped circuit breaker within the panel.

The system may also include a signal transmitter adapted to send a signal representative of an identifier of the tripped circuit breaker to a communications device (e.g., a local area network (LAN) or home area network (HAN) adapter). For example, the signal may be in the form of one or more Internet Protocol (IP) packets. The IP packets may be transmitted via a LAN adapter over a LAN (e.g., WiFi, Ethernet, etc.), connected to the Internet (e.g., router connect to a cable modem), to a service provider's address on the Internet. The service provider's server may be adapted to receive the IP packets and initiate a phone call, text message, email, or other automated communication to the cell phone, computer, tablet, or other communication device of the user (e.g., resident or homeowner). The communication from the service provider may report the circuit breaker trip/power loss event to the user along with additional status information. For example, the signal from the system may also indicate the status of other circuit breakers within the panel.

In some embodiments, the system may include local facilities to communicate directly with the user without a service provider server. In other words, for example, the system may include a connection to a telephone line and a dialing capability or an outgoing Voice over IP (VoIP) capability. The system may be adapted to generate a voice message to report the circuit breaker trip event to the user along with other status information. In another example, the system may additionally or alternatively include the capability to generate and transmit an email or text message to the user to report the circuit breaker trip/power loss event.

In some embodiments, the system may include an operating handle position sensor on each circuit breaker in the panel. Each sensor may include a circuit adapted to generate a signal to report the status of the associated circuit breaker. The system may include a single communications controller adapted to receive the status signals from the sensors and transmit a signal to a remote service provider (e.g., LAN to Internet) or to a local communications facility that can communicate directly with the user without a service provider server. In some embodiments, the system may include independent communication capabilities for each circuit breaker. In such embodiments, each circuit breaker includes a status sensor and the ability to report status to the user. A Smartphone application (e.g., an iPhone® application, a Droid® application, etc.) may be used to receive the status from the circuit breakers and consolidate the information into a simple display or report. In some embodiments, the system may detect and report the presence or absence of power to the branch circuit associated with the circuit breaker in addition or alternatively to detecting the position of the operating handle of the circuit breaker.

In some embodiments, electronic circuit breakers with may be used each with an incorporated transmitter. The transmitter may couple to a repeater with access to the Internet through, e.g., a homeowner's WiFi connection. A circuit breaker can lose power in two ways. The breaker can trip and the contacts fully open or the main contacts could separate and the device will lose power but the handle position indicates "On." In either event, the communication between the electronic circuit breaker and repeater will be broken. In such an event, a signal may be sent to an Internet Linking Controller (ILC) which in turn can communicate the status (e.g., place a call to the homeowner's cell phone, send a text or email message, etc.).

In some embodiments, the panel and/or circuit breakers of the system of the present invention may include a built-in communications capability coupled to the sensors (e.g., an on-board Zigbee® system-on-chip. ZigBee is a specification for a suite of high-level communication protocols using small, low-power digital radios (e.g., wireless mesh) based on an IEEE 802 standard for personal area networks and/or home area networks (HAN). Applications include wireless light switches, electrical meters with in-home displays, and other consumer and industrial equipment that use short-range wireless transfer of data at relatively low rates. The technology defined by the ZigBee specification is intended to be simpler and less expensive than other WPANs, such as Bluetooth. ZigBee is targeted at radio-frequency (RF) applications that require a low data rate, long battery life, and secure networking. ZigBee has a defined rate of 250 kbits best suited for periodic or intermittent data or a single signal transmission from a sensor or input device. The ZigBee Smart Energy V2.0 specifications define an IP-based protocol to monitor, control, inform and automate the delivery and use of energy and water. It is an enhancement of the ZigBee Smart Energy version 1 specifications, adding services for installation, configuration and firmware download, prepay services, user information and messaging, load control, demand response and common information and application profile interfaces for wired and wireless networks.). This built-in communications capability may be used to allow the circuit breakers and/or panel to communicate with home area networks.

In some embodiments, a communications facility for the panel or circuit breakers of the present invention can be implemented as a small printed circuit board assembly (PCBA) with a system-on-chip design. Elements of the PCBA can include communication capabilities such as Zigbee, Wi-Fi, cellular modem, wired Ethernet and the like. In a manner similar to that of a memory stick, the PCBA can be shrouded in plastic to prevent risk of damage due to electrostatic discharge. The communications PCBA can include a standard connector for connecting to the panel or circuit breakers. For example, a USB interface, a DB-9 connector, an RJ-45 connector, USNAP, or any practicable connector can be used.

The present invention communicates circuit breaker status to the homeowner upon a trip event. Embodiments of the invention are applicable to any type of breaker in the panel because the status may be determined based upon the circuit breaker operating handle position. This includes electronic and standard thermal/magnetic circuit breakers. In some embodiments, the system includes an optical beam sensor, a personal computer (PC), control software, communications software, a modem, a router, and a VoIP device, and Internet Cloud (e.g., a remotely hosted service (RHS)) connections. These connections can be wireless or hardwired or any combination needed to make the connection.

Laser, ultrasonic, and/or other beams may be used in alternative embodiments of the invention. An optical beam sensor includes a beam transmitter/receiver and a reflector. In some embodiments, the optical beam sensor transmitter/receiver is disposed at the top of the panel aimed down and the reflector is disposed at the bottom of the panel facing upward at the transmitter/receiver. For a panel with two columns of circuit breakers, two optical beam sensors may be used for either side of the panel. In other words, one beam is used for each column of circuit breakers in the panel. In some embodiments, the optical beam and reflector may be field mounted (e.g., added after the panel had already been installed in the residence) to the inside of a residential circuit panel door or on the housing.

The beam is adapted to reflect off of the reflector if all the circuit breakers are "On" or reflect off a breaker handle in the event of a circuit breaker that has tripped. The beam length is reduced by the circuit breaker operating handle when a device trips. Because circuit breakers are typically manufactured in ½", 1" and 2" thicknesses, the beam length can be used to identify the breaker position in the panel of the tripped breaker. In some embodiments, the beam length may be monitored using a control software program executed on a controller coupled to the sensors or on a PC coupled to the sensors. Once a circuit breaker has tripped, the beam length is reduced and the control software program monitoring the beam length is adapted to recognize when a change in the beam length has occurred. The control software program is further adapted to identify/determine the breaker position based on the beam length and the tripped breaker installed in the panel.

In some embodiments, once a change in the beam length has been detected, the control software is adapted trigger a communications program (e.g., telephony, email, etc.) on the PC. The communications program may include pre-recorded text and/or voice messages that are based on the input from the beam length monitoring program. The communications program may also have caller ID's identified and be adapted to contact the number(s)/address(es) programmed into the program with a text and/or voice message. In some embodiments, a phone call may be made through a VoIP device and/or the Internet Cloud using the homeowner's router to access the Internet Cloud.

In embodiments where the Internet Cloud is used, the control program monitoring the beam length may be adapted to interface with the user's HAN to access the remotely hosted service. The RHS provider's server is adapted to monitor incoming signals reporting a circuit breaker trip event. Upon receipt of such a signal, the RHS provider's server is adapted to initiate one or more phone calls with pre-recorded text and/or voice messages. In some embodiments, a Smartphone application may be used to enhance the communication of the breaker status with an alert alarm and/or graphical representation indicating the tripped breaker and the status of the remaining breakers. In the event of no signal being generated or received by the RHS provider's server due to loss of power, the system may be adapted to send a message to the homeowner indicating the loss of power. Alternatively, a backup power supply may be included in the system for such an event.

In an alternate embodiment, a signal transmitter may be incorporated into each circuit breaker in the panel. This embodiment employs a signal transmitter, a repeater, an Internet Linking Controller (ILC), a modem, a router, and a phone line. The signal transmitter may be located on the printed circuit board (PCB) within the circuit breakers. When the circuit breaker is turned to the "On" position, the breaker begins transmitting a single to the repeater. The breakers are located in a panel and the addresses are identified by the breakers' locations inside the panel. The signal transmitter is adapted to send out a signal that indicates the breaker is operative and the breaker's panel address. Located relatively near the panel, a repeater is disposed to communicate with the breakers in the panel. Upon a trip event, this communication is broken. The repeater may include a battery backup to handle the case that the circuit powering the repeater loses power. The repeater may send out a signal that a circuit breaker has tripped or lost power to the Internet Linking Controller (ILC). Multiple repeaters may be used to identify different zones in the home. The zones may be used to record more specific messages in the ILC. In some embodiment, the ILC includes a database of phone numbers/addresses and pre-recorded messages stored in internal memory. In such embodiments, the ILC may be operative to access the stored numbers/addresses to contact the homeowner via VoIP or a standard phone line.

Various embodiments of the invention will be explained in greater detail with reference to FIGS. 1 to 6 below.

Turning now to FIG. 1, an example embodiment of a circuit breaker trip notification system 100 is depicted. The system 100 includes an electrical distribution panel 102 with several circuit breakers 104 (only one labeled with a reference numeral) regularly spaced and arranged in columns. Other arrangements of the circuit breakers 104 are possible. Note that some circuit breakers occupy a space that is a multiple of standard size breakers and others occupy fractional size spaces of the standard size breakers (e.g., 2", 1", ½' and ¼" breakers). A sensor 106 is disposed to monitor and detect a change in the status of the circuit breakers 104 based on the position of operating handles of the circuit breakers 104. A control circuit 108 including control logic is coupled to the outputs of the sensor 106 and adapted to receive a signal from the sensor 106 that can be used to determine the identity of a tripped circuit breaker 104. The control circuit 108 is also coupled to a communications device 110 which is operable to transmit a signal representative of an identifier of a circuit breaker 104 with an operating handle in the tripped position. The communications device 110 may be implemented as a local area network (LAN) adapted (e.g., wired or wireless) that is operable to communicate with a router/modem 112 to transmit the signal with the tripped breaker information via the Internet 114 to a remote hosted service (RHS) server 116. The RHS server 116 is adapted to receive the signal representative of an identifier of a circuit breaker 104 with an operating handle in the tripped position, in response to receiving such a signal, the RHS server 116 is adapted to send a notification message to a user that informs the user that a circuit breaker 104 has tripped and which breaker it is. The notification message may additionally include other information such as, for example, the status of other circuit breakers 104, the time of the trip event, and which zone in the residence is without power.

The notification message from the RHS server 116 may be sent to a user's personal communication device 118 (e.g., a cell phone, a Smartphone, a tablet, a phablet, a laptop computer, a landline telephone, etc.) and/or to the user's personal computer (PC) 120. In some embodiments, the notification message from the RHS server 116 may be in the form of a text message, an email message, an alert from a Smartphone/tablet application, a voicemail message, a phone call from the RHS server 116, or the like. For example, upon receipt of the notification message, a Smartphone application running on the PCD 118 may pop up a display message and graphic indicating that, e.g., at 2 PM the branch circuit that powers the user's refrigerator lost power due to a circuit breaker 104 trip event. The graphic may depict an image of the panel 102 and a red flashing highlighted image of the tripped circuit breaker 104 at the position of the actual tripped breaker 104 within the panel 102.

In some embodiments, the communications device 110 may include a cellular modem or other device and be adapted to communicate directly with the user's personal communications device 118 and/or the user's PC 120. In such embodiments, communications device 110 and/or the control circuit 108 may be adapted to generate and transmit the notification message. In some embodiments, the communications device 110, the control circuit 108, and/or the sensor 106 may be implemented as a single integrated device with the functional capabilities described above. In some embodiments, all or some of the connections between the various components of the system 100 may be implemented using wireless connections and in some embodiments, all or some of the connections between the various components of the system 100 may be implemented using wired connections.

Turning now to FIGS. 2 and 3, more detailed views of the panel 102 are provided. FIG. 2 depicts a front plan view of the panel 102 (with the door removed for clarity) and FIG. 3 depicts a side cross-sectional view of the panel 102. In some embodiments as shown in the drawings, sensor 106 includes a beam transmitter/receiver 200 for each column of circuit breakers 104 in the panel 102. Two are shown in the example of FIG. 2. Each beam transmitter/receiver 200 is disposed to project a beam 202 (e.g., optical, sonic, laser, etc.) at a reflector 204 which reflects the beam 202 back to the transmitter/receiver 200. The transmitter/receiver 200 is disposed so that the beam 202 is projected along a path adjacent the circuit breakers 104 in a given column such that the beam 202 passes each circuit breaker 104 in the column if the operating handle of each circuit breaker 104 is not in the tripped position. Thus, the circuit breakers in FIGS. 2 and 3 all have their operating handles in the "ON" position and no breakers are in a tripped state. The sensor 106 is adapted to determine the length of the beam 202 when all breakers 104 have their operating handles in the "ON" position. This length measurement, indicated by dimension "A" in FIG. 3, is stored in control circuit 108.

In some embodiments, control circuit 108 may be implemented using a programmed processor with storage memory, discrete digital logic, and/or using a field programmable gate area (FPGA). An example of a commercially available FPGA suitable to implement the control circuit 108 is the model Virtex-7 manufactured by Xilinx, Inc. of San Jose, Calif., USA. Any practicable FPGA may be used. In some embodiments, sensor 106 may be implemented using one or more LED distance measurement sensors such as the commercially available model OWRB 4040 AA S1 LED distance sensor manufactured by Welotec GmbH of Leer, Germany as the transmitter/receiver 200. Any practicable transmitter/receiver may be used. The reflector 204 may be implemented using any practicable material that will reliably reflect whatever type of beam technology is used. Note that in some embodiments, all or part of the sensor 106 may be mounted on the door 206 of the panel such that the door 206 is in a closed position to make the system 100 operable. Thus, the sensing of the beam 202 may operate in the darkened enclosure of the panel where ambient light is prevented from interfering with the sensor's operation. (Note that in FIG. 2, the door 206 is not represented for clarity purposes.) In some embodiments, the communications device 110 may be implemented using, for example, a wireless LAN adapter. An example of a commercially available wireless LAN adapter is the model Wireless-N Nano USB 2.0 Adapter manufactured by D-Link Corporation of Fountain Valley, Calif., USA. Any practicable LAN adapter may be used.

Figure 4:
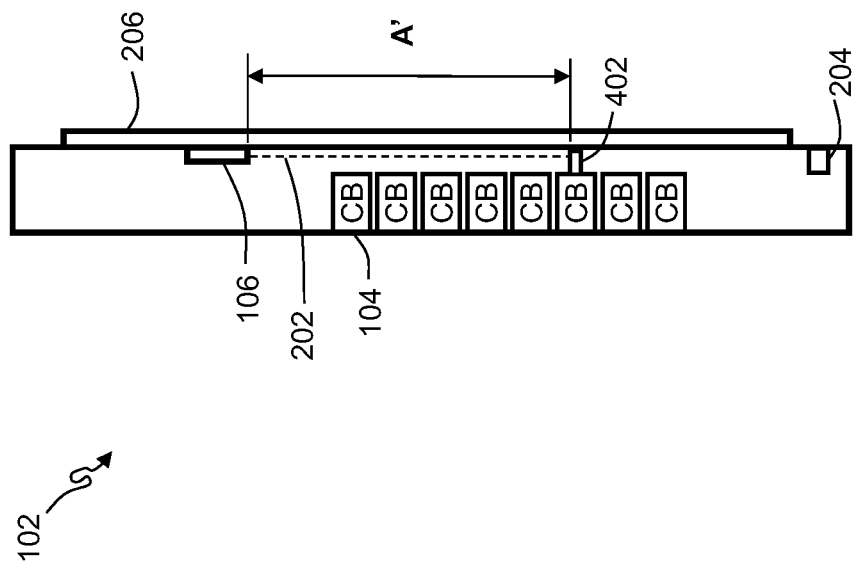
FIG. 4 is a side cross-section view of an electrical distribution panel with a circuit breaker operating handle position sensor showing a handle in a tripped position according to some embodiments of the present invention.

Turning now to FIG. 4, a side cross-sectional view of the panel 102 with a tripped circuit breaker 104 is provided. In the example, the operating handle 402 of the sixth circuit breaker 104 from the top of the panel is in the tripped position. In the tripped position, the operating handle 402 of the circuit breaker intercepts the beam 202 and prevents the beam 202 from reaching the reflector 204. Instead, the beam 202 is reflected back to the transmitter/receiver 200 by the operating handle 402. From the perspective of the sensor 106, the length of the beam 202 has been reduced from dimension A to dimension A'. Because the circuit breakers 104 are regularly spaced within the panel 102, the shortened beam length corresponds to the position of the tripped circuit breaker 104. Thus, based on the shortened beam length and the particular the transmitter/receiver 200 detecting the change, the tripped circuit breaker 104 can be identified. In some embodiments, the control circuit 108 may be adapted to determine the identifier of the tripped circuit breaker 104 and in some embodiments, the RHS server 116, personal communications device 118, or the PC 120 may make the determination of the identity of the tripped circuit breaker 104 based on the beam length and the transmitter/receiver 200. In all of these embodiments, a stored record of the circuit breakers 104 in the panel 102 is used to determine which breaker corresponds to the measured beam length. For example, if a shortened beam length of 6" is measured by the transmitter/receiver 200 on the right side of the panel 102, and the stored record of the circuit breakers 104 in the right side column from top to bottom is:

| BREAKER NUMBER | AMPERAGE | THICKNESS |
|---|---|---|
| 2 | 30 | 2" |
| 4 | 30 | 2" |
| 6 | 20 | 1" |
| 8 | 15 | ½" |
| 10 | 15 | ½" |
| 12 | 15 | ½" |
| 14 | 15 | ½" |
| 16 | 15 | ½" |
| 18 | 15 | ½" |
| 20 | 15 | ½" |
| 22 | 15 | ½" |

The tripped circuit breaker would be number 12 since circuit breaker number 12 is 6 inches from the top of the column where the transmitter/receiver 200 is positioned. Note that through out the description, the examples used describe the transmitter/receiver 200 positioned above the column. However, in some embodiments, the transmitter/receiver 200 may be positioned below the column of breakers. In addition, the system 100 may include two or more transmitter/receivers 200 for monitoring a single column of breakers 104. In some embodiments, a first transmitter/receiver 200 may be disposed above each column and a second transmitter/receiver 200 may be positioned below each column. This arrangement may allow the system 100 to concurrently identify more than one tripped breaker per column.

Figure 5:
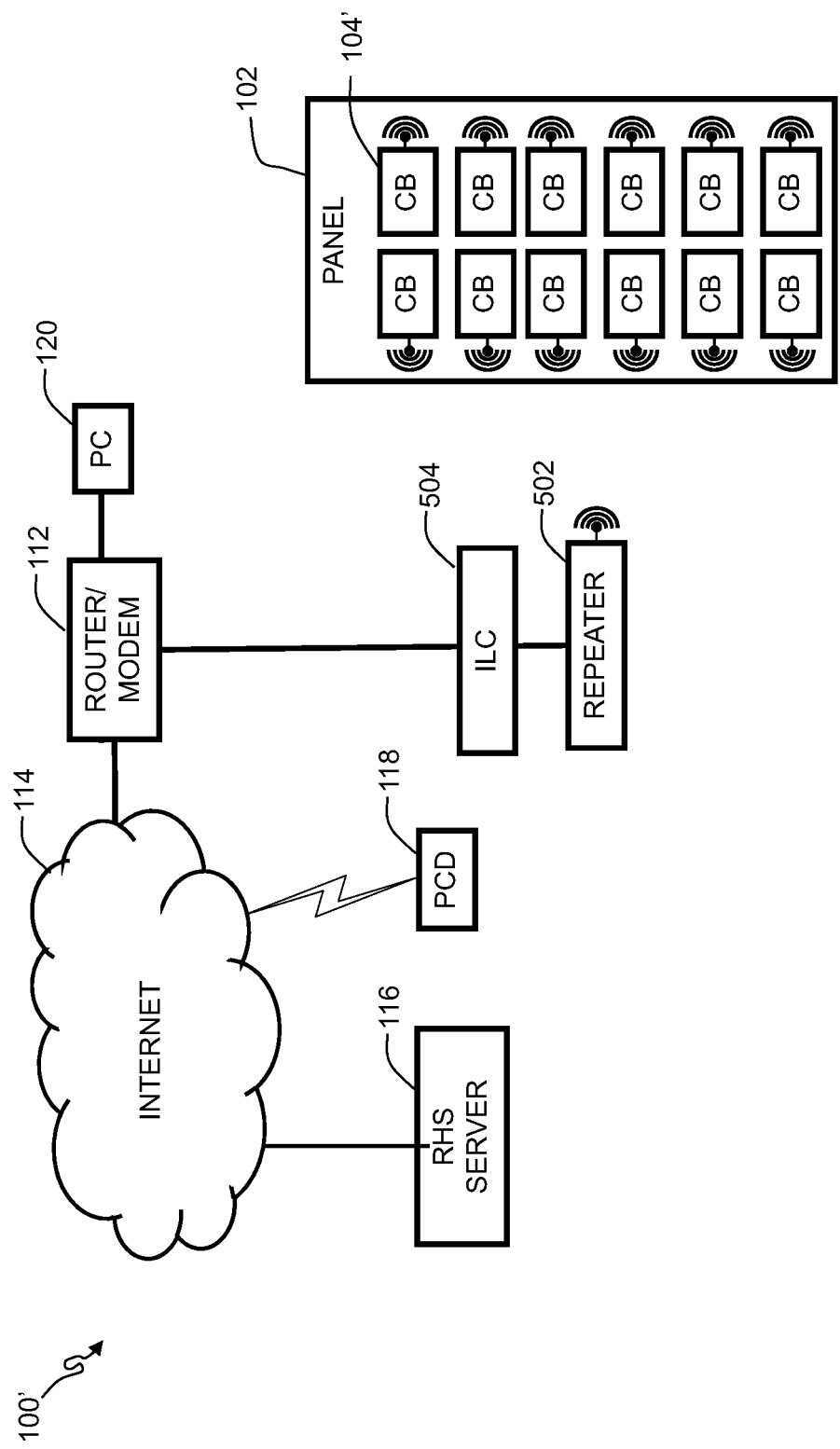
FIG. 5 is a block diagram depicting an example of an alternative circuit breaker trip notification system according to some embodiments of the present invention.

FIG. 5 depicts an alternative system 100' of the present invention that employs electronic circuit breakers 104' with transmitters coupled to each electronic circuit breaker 104'. Each transmitter is adapted to regularly transmit a unique "heartbeat" signal every few seconds or minutes while the associated circuit breaker 104' is "On" and has power. A repeater 502 is adapted to receive the heartbeat signals and monitor for a circuit breaker 104' that has stopped transmitting indicating a trip event or power loss on the particular circuit breaker 104'. In some embodiments, the system 110' may use near field communications (NFC) to implement the heartbeat signaling to the repeater 502. In some embodiments, the repeater 502 may be a multi-channel repeater adapted to receive signals at different, unique frequencies to distinguish the different circuit breakers, and in some embodiments, the repeater 502 may decode the signals to find an identifier indicia within the signals to distinguish the different circuit breakers 104'. In some embodiments, the transmitters within each circuit breaker may receive separate power such that a trip event or power loss event does not stop transmission of the heartbeat signal and instead the transmitter sends a modified signal to the repeater 502 indicating the change in status. For example, a digital signal that indicates a circuit breaker has tripped may include a field in a communication packet that represents that status of the circuit breaker where e.g., "0" indicates "On" and "1" indicates "Tripped". The separate power may be implemented using battery back-up or simply separately wired connections to the circuit breakers 104'. In some embodiments, the electronic circuit breakers 104' may only transmit a signal when the breaker trips or loses power.

In some embodiments, the repeater 502 is operative to generate a signal based on the aggregation of the heartbeat/status signals from the electronic circuit breakers 104' that identifies a tripped circuit breaker. For example, the generated signal may be generated based upon a circuit breaker 104' not having been heard from for more than a preset time period. The generated signal may be transmitted to an Internet Linking Controller 504 which is adapted to communicate the identity of a tripped circuit breaker 104' and other information to a RHS server 116 and/or to a user's PC 120 via a router/modem 112 and/or the Internet 114. As with the system 100 illustrated in FIG. 1, the system 100' illustrated in FIG. 5 may provide a notification communication to the user in many different ways.

The RHS server 116 is adapted to receive the signal representative of an identifier of a tripped circuit breaker 104'. In response to receiving such a signal, the RHS server 116 is adapted to send a notification message to a user that informs the user that a circuit breaker 104' has tripped and which breaker it is. The notification message may additionally include other information such as, for example, the status of other circuit breakers 104', the time of the trip event, and which zone in the residence is without power.

The notification message from the RHS server 116 may be sent to a user's personal communication device 118 (e.g., a cell phone, a Smartphone, a tablet, a phablet, a laptop computer, a landline telephone, etc.) and/or to the user's personal computer (PC) 120. In some embodiments, the notification message from the RHS server 116 may be in the form of a text message, an email message, an alert from a Smartphone/tablet application, a voicemail message, a phone call from the RHS server 116, or the like. For example, upon receipt of the notification message, a Smartphone application running on the PCD 118 may pop up a display message and graphic indicating that, e.g., at 2 PM the branch circuit that powers the user's refrigerator lost power due to a circuit breaker 104 trip event. The graphic may depict an image of the panel 102 and a red flashing highlighted image of the tripped circuit breaker 104 at the position of the actual tripped breaker 104 within the panel 102.

In some embodiments, the ILC 504 may include a cellular modem or other device and be adapted to communicate directly with the user's personal communications device 118 and/or the user's PC 120. In such embodiments, ILC 504 and/or the repeater 502 may be adapted to generate and transmit the notification message. In some embodiments, the ILC 504 and, the repeater 502 may be implemented as a single integrated device with the functional capabilities described above. In some embodiments, all or some of the connections between the various components of the system 100' may be implemented using wireless connections and in some embodiments, all or some of the connections between the various components of the system 100 may be implemented using wired connections.

Figure 6:
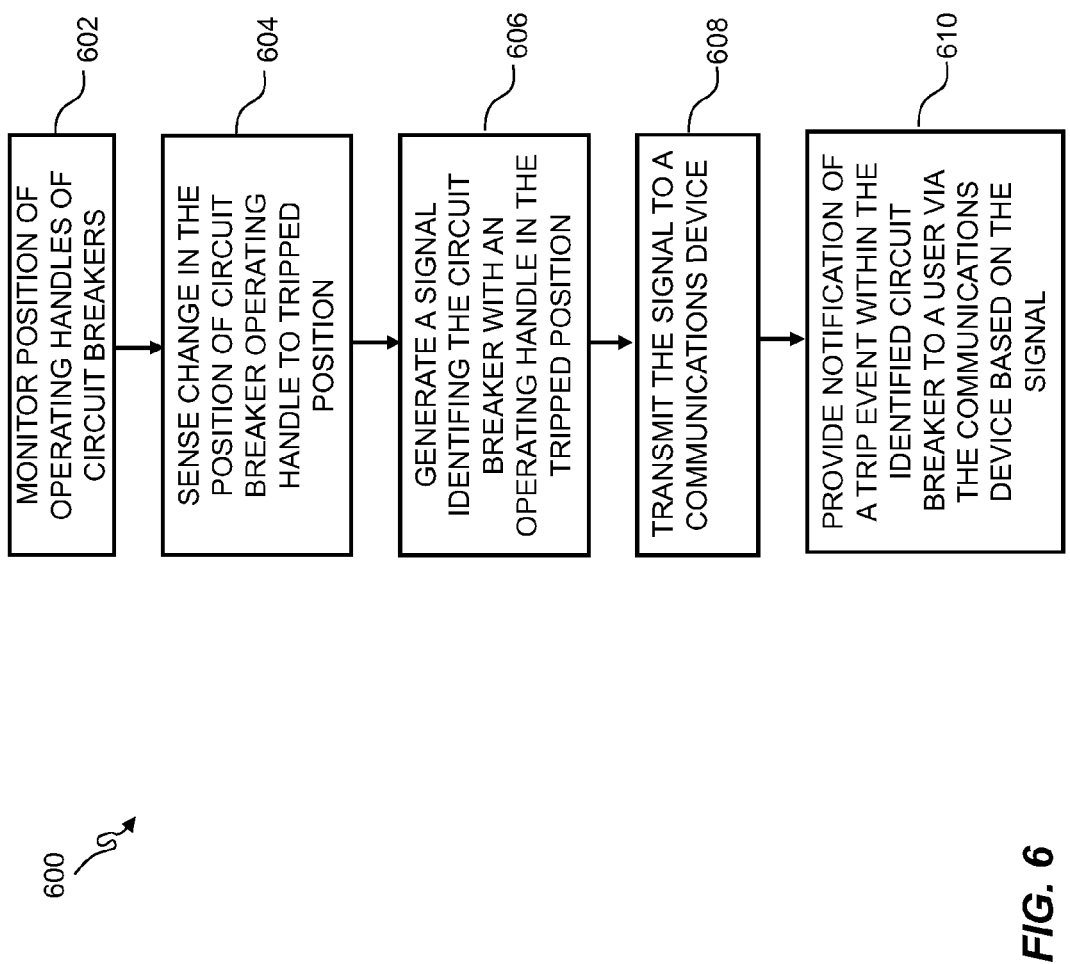
FIG. 6 is a flowchart depicting an example method of providing notification of a circuit breaker tripping event according to some embodiments of the present invention.

Turning now to FIG. 6, a flowchart depicting an example method 600 of the present invention is provided. In step 602, the position of the operating handles of the circuit breakers in a panel are monitored. In step 604, if a breaker trips, the change in the circuit breaker's operating handle is sensed by the system. In step 606, a signal identifying the circuit breaker with a handle in the tripped position is generated. In step 608, the generated signal is transmitted to a communications device. In step 610, notification of the trip event and the identity of the tripped breaker are provided to a user via the communications device based on the generated signal. In some embodiments, the notification is provided by a remote hosted service in response to receiving the generated signal.

It should be readily appreciated by those persons skilled in the art that the present invention is susceptible of broad utility and application. Many embodiments and adaptations of the present invention other than those herein described, as well as many variations, modifications, and equivalent arrangements, will be apparent from, or reasonably suggested by, the present invention and the foregoing description thereof, without departing from the substance or scope of the present invention. Accordingly, while the present invention has been described herein in detail in relation to specific embodiments, it is to be understood that this disclosure is only illustrative and presents examples of the present invention and is made merely for purposes of providing a full and enabling disclosure of the invention. This disclosure is not intended to limit the invention to the particular systems or methods disclosed, but, to the contrary, the intention is to cover all modifications, equivalents, and alternatives falling within the scope of the invention.

What is claimed is:

1. A method of notifying a user of a circuit breaker trip event, the method comprising:
    providing a plurality of circuit breakers disposed in one or more columns;
    monitoring a position of operating handles of one column of the circuit breakers with a sensor wherein monitoring the position of the operating handles of the circuit breakers includes projecting a sensor beam from the sensor along a path including the plurality of circuit breakers in the one column through the tripped position of the operating handles of the circuit breaker in the column wherein the at least one sensor is disposed so that the operating handles intercept the sensor beam when in the tripped position;
    sensing a change in the position of the circuit breaker operating handles with the sensor beam to a tripped position when one of the operating handles moves to a position along the path that intercepts the sensor beam;
    generating, based on a change in length of the sensor beam, a first signal representative of an identifier of a particular circuit breaker of the circuit breakers in the column with the operating handle in the tripped position;
    transmitting the first signal to a communications device; and
    providing notification of a trip event within and an identity of the particular circuit breaker that is tripped to a user via the communications device.

2. The method of claim 1 wherein sensing a change in the position of the circuit breaker operating handles includes determining that the beam is being reflected by the operating handle of the particular circuit breaker in the column.

3. The method of claim 2 wherein determining that the beam is being reflected by the particular circuit breaker operating handle includes determining that a length of the beam has been shortened.

4. The method of claim 3 wherein generating a first signal representative of an identifier of the particular circuit breaker with the operating handle in the tripped position includes determining the identifier of the particular circuit breaker with the operating handle in the tripped position based upon the length of the beam.

5. A method of notifying a user of a circuit breaker trip event, the method comprising:
    monitoring a position of an operating handle of a circuit breaker wherein monitoring a position of the operating handle of the circuit breaker includes transmitting, from a transmitter to a repeater, a first signal indicating the circuit breaker has not tripped;
    sensing a change in the position of the circuit breaker operating handle to a tripped position wherein the sensing a change in the position of the circuit breaker operating handle includes breaking communication between the circuit breaker and the transmitter and the repeater;
    determining that the first signal is not being transmitted by the transmitter due to the breaking communication;
    generating, based upon the lack of the first signal, a second signal representative of an identifier of the circuit breaker with the operating handle in the tripped position;
    transmitting the second signal to a communications device; and
    providing notification of a trip event within the identified circuit breaker to a user via the communications device.

6. A system operative to notify a user of a circuit breaker trip event, the system comprising:
    a panel including a plurality of circuit breakers disposed in one or more columns;
    at least one sensor disposed on the panel to monitor a position of an operating handles of at least one of the circuit breakers in one column of the one or more columns wherein the sensor includes a beam transmitter and a receiver, and wherein the transmitter is disposed to project a beam along a path including the plurality of circuit breakers in the one column through the tripped position of the operating handles of the circuit breaker wherein the at least one sensor is disposed so that the operating handle intercepts the beam when in the tripped position;
    a circuit adapted to receive input from the sensor and to generate a first signal representative of an identifier indicating an identity of a particular circuit breaker in the one column of circuit breakers in the panel with an operating handle in a tripped position; and
    a communications device adapted to receive the first signal and provide notification of a trip event within the particular circuit breaker to a user.

7. The system of claim 6 wherein the operating handle of the particular circuit breaker is adapted to reflect the beam back to the receiver when the operating handle is in the tripped position.

8. The system of claim 7 wherein the operating handle shortens a length of the beam when in the tripped position.

9. The system of claim 8 wherein the circuit is adapted to determine the position of a tripped circuit breaker based on the length of the beam when an operating handle is in the tripped position.

10. The system of claim 6 wherein the notification of a trip event includes an indication of a branch circuit associated with the particular circuit breaker.

11. The system of claim 6 wherein a first sensor is disposed to monitor a first column of circuit breakers and a second sensor is disposed to monitor a second column of circuit breakers.

12. An apparatus adapted to be added to a circuit breaker panel and operative to notify a user of a circuit breaker trip event, the apparatus comprising:
    at least one sensor adapted to be disposed to monitor a position of an operating handle of at least one of circuit breaker of a plurality of circuit breakers in a column of circuit breakers within a panel wherein the at least one sensor includes a beam transmitter and a receiver, and wherein the transmitter is disposed to project a beam along a path including the plurality of circuit breakers in the column through the tripped position of the operating handle of the circuit breaker wherein the at least one sensor is disposed so that the operating handle intercepts the sensor beam when in the tripped position;

a circuit coupled to the sensor, adapted to receive input from the sensor, and adapted to generate a first signal representative of an identifier indicating an identity of a particular circuit breaker with an operating handle in a tripped position along the path in the column of circuit breakers in the panel; and a communications device adapted to receive the first signal and provide notification of a trip event within the particular circuit breaker to a user.

13. The apparatus of claim 12 wherein the operating handle of the circuit breaker is adapted to reflect the beam back to the receiver when the operating handle is in the tripped position.

14. The apparatus of claim 13 wherein the operating handle shortens a length of the beam when in the tripped position.

15. The apparatus of claim 14 wherein the circuit is adapted to determine the position of a tripped circuit breaker based on the length of the beam when an operating handle is in the tripped position.

16. The apparatus of claim 12 wherein the notification of a trip event includes an indication of a branch circuit associated with the identified tripped circuit breaker.

17. A system operative to notify a user of a circuit breaker trip event, comprising:
- a panel including a plurality of circuit breakers disposed in one or more columns;
- at least one sensor disposed to monitor a position of an operating handle of at least one of the circuit breakers, the sensor comprising a transmitter that transmits a first signal to a repeater indicating that the circuit breaker has not tripped;
- sensing a change in the position of the circuit breaker operating handle and breaking communication between the circuit breaker and the repeater;
- determining that the first signal is not being transmitted by the transmitter;
- a circuit adapted to receive input from the sensor and to generate a second signal representative of an identifier of a circuit breaker with an operating handle in a tripped position based upon the lack of the first signal; and
- a communications device adapted to receive the second signal and provide notification of a trip event within the identified circuit breaker to a user.

* * * * *